United States Patent
Capolunghi et al.

(10) Patent No.: US 8,036,490 B2
(45) Date of Patent: Oct. 11, 2011

(54) METHOD FOR MEASURING THE DIMENSIONS OF A VESSEL

(75) Inventors: Renaud Capolunghi, Vanves (FR);
Pascal Pineau, Villebon sur Yvette (FR);
Laurent Launay, St. Rémy lès Chevreuse (FR)

(73) Assignee: General Electric Company, Schenectady, NY (US)

( * ) Notice: Subject to any disclaimer, the term of this patent is extended or adjusted under 35 U.S.C. 154(b) by 999 days.

(21) Appl. No.: 11/940,378

(22) Filed: Nov. 15, 2007

(65) Prior Publication Data
US 2008/0123926 A1 May 29, 2008

(30) Foreign Application Priority Data
Nov. 24, 2006 (FR) ...................................... 06 55104

(51) Int. Cl.
*G06K 9/00* (2006.01)
*G06K 9/36* (2006.01)
(52) U.S. Cl. ........................................ 382/286; 382/128
(58) Field of Classification Search .................. 382/128, 382/131, 286; 600/449, 587
See application file for complete search history.

(56) References Cited

U.S. PATENT DOCUMENTS

| | | | |
|---|---|---|---|
| 6,278,767 B1 * | 8/2001 | Hsieh | 378/163 |
| 6,404,922 B1 * | 6/2002 | Maruya | 382/203 |
| 6,625,565 B1 * | 9/2003 | Alyassin et al. | 702/167 |
| 7,570,802 B2 * | 8/2009 | Iordanescu et al. | 382/154 |
| 2004/0249270 A1 * | 12/2004 | Kondo et al. | 600/425 |
| 2005/0110791 A1 | 5/2005 | Krishnamoorthy et al. | |
| 2005/0147283 A1 * | 7/2005 | Dwyer et al. | 382/128 |
| 2006/0241427 A1 * | 10/2006 | Kinouchi et al. | 600/437 |

FOREIGN PATENT DOCUMENTS

| | | | |
|---|---|---|---|
| JP | 2004201873 A | * | 7/2004 |
| WO | WO 01/43073 | | 6/2001 |
| WO | WO 03/045244 | | 6/2003 |

* cited by examiner

*Primary Examiner* — Yubin Hung
(74) *Attorney, Agent, or Firm* — Global Patent Operation; Jonathan E. Thomas

(57) ABSTRACT

To measure the dimensions of a tubular vessel, it is planned to plot a set of wall lines on the surface of the vessels. Then, the lengths of these wall lines are measured between a starting section and an arrival section. The plotting of the wall lines starts from a central line of the vessel divided into segments. For each central line segment, a wall line segment is defined on the wall by intersection of a plane containing this central line segment and intersecting this wall. Other wall line segments are distributed all around and all along the wall. Then, the lengths are measured.

7 Claims, 3 Drawing Sheets

METHOD FOR MEASURING THE DIMENSIONS OF A VESSEL

BACKGROUND OF THE INVENTION

1. Field of the Invention

The field of the present invention relates to medical diagnostic techniques generally, and more particularly to a method for measuring the dimensions of a vessel. The term "vessel" refers to the vessels and ducts of the human body, namely the blood vessel and the ducts such as the urethra that convey other liquids. An aim of the invention is to provide greater knowledge of the size and geometry of these vessels and ducts in order to facilitate subsequent therapeutic action. One of the most immediate applications of the invention is in the insertion of stents. Naturally, other uses of the dimension-measuring method of the invention can be envisaged.

2. Description of the Prior Art

A stent is a small metal spring that is slid into a natural human cavity in order to keep it open. It is used essentially in arteries in angioplasty. A stent can also be used in the urethra, the bile ducts etc. Angioplasty is a procedure used to dilate a narrowed artery by means of a balloon that is inflated in this artery, thus crushing an atheromatous plaque that has caused a stenosis. The main drawback of this technique is the high rate of restenosis, i.e. the repetition of the narrowing process which occurs in almost half of the cases. This restenosis may be premature (the elastic return of the artery after the balloon has been deflated) or delayed by proliferation of cells in the wall (the endothelium) of the artery.

To be put in place, the stent is positioned on a folded angioplasty balloon. The unit is conveyed into the vessel until the place of intervention. When the balloon is inflated in the artery, the spring expands and prevents the elastic return of the stenosis. The balloon is then withdrawn and the stent remains in place. It may be positioned by direct stenting or after dilation by a first balloon. The positioning of the stent is done under radioscopy and does not appreciably lengthen the angioplasty procedure.

Since the stent is foreign to the human body, it is a natural point of focus for the formation of a clot. A clot-prevention treatment therefore remains indispensable for at least several weeks, until the metal is naturally coated with the cells of the internal walls of the artery, in a process of endothelialization. This treatment is based on aspirin in small doses, historically associated with ticlopidine. At present, the preferred association consists of aspirin and clopidogrel, two platelet antiaggregants. The stent very appreciably diminishes the frequency of restenosis after angioplasty. It is very commonly used during angioplasty. There is no allergy. Although made of metal, it does not hamper an IRM operation.

A stent is characterized by its diameter (once unfolded) and its length. The problems posed by stents are essentially related to the need to know their exact dimensions, especially when the part of the duct in which they have to be implanted is curved. In practice, since the vessel has a tube-like structure, it is necessary to know the longest dimension of the stent and its shortest dimension so as to foresee its average curvature and hence its implantation.

The measurement of the vessels in the body by 3D imaging is now a well-established medical procedure. This procedure is leading to a simplification of surgical operations and radiology operations. There are numerous medical image-processing techniques to help in this task. The applications most commonly used serve to determine the size and geometry of a prosthetic device. In particular, they serve to measure the lengths, diameters and volumes to prepare a positioning of the stent in a vessel, such as the coronary artery, the carotid, the iliac artery, etc. that has undergone stenosis.

The technique currently used for sizing stents is to determine the central line in the vessels, and measure the length of this central line. Such an approach naturally implies that the vessel to be measured is straight, or at least that it will become straight, after the prosthesis has been put in place. However, such an assumption is not valid for certain vessels. For, it is increasingly common to place stents in a portion of the thoracic artery that may have a curvature of more than 90 degrees. When deployed, the shape of the stent adapts to the shape of the aorta in being curved. In this case however, in order to choose the appropriate stent, it is very important to know its exact dimensions.

To resolve this problem, the invention has come up with the idea of computing a set of lengths on the image of the vessel to be fitted out, preferably a minimum length and a maximum length, so as to have knowledge of all the constraints that the stent will have to support. The invention shall be described in the context of the thoracic artery but it can also be applied to any other curved tubular structure.

According to the invention, on the tubular image of the vessel, the method starts by the plotting of lines applied to the tubular surface. Thus, a certain number of lines are plotted, evenly separated from one another as much as possible, that never intersect one another and support minimum torsion.

In practice, after having obtained a 3D digital acquisition of the image of the vessel, a central line of this vessel is sought. With the knowledge of this central line, two processing operations are performed. Firstly, a segmentation of the digital image is performed starting from this central line to find the position of the walls of the tubular vessel. Secondly, this central line is subdivided into a set of segments whose number will be all the greater as the dimensions of the vessel have to be approached with greater precision. In practice, it can be noted that, over a real length of 3 cm for a vessel, about 30 segments can be envisaged but the number of these segments may be greater or smaller.

Wall line portions corresponding to these segments are plotted on the walls of the vessel. The wall line portions are joined to one another and form total wall lines whose length is definitively measured. This mode of action gives knowledge of the maximum length, the minimum length, the mean length and many other items of information on the length of the vessel and therefore on the length of the stent to be positioned in the vessel. The choice of this stent may be more appropriate.

SUMMARY OF THE INVENTION

An embodiment of the invention provides a method for the measurement of the dimensions of a vessel, typically a blood vessel. The method may include making a 3D acquisition of characteristics of a body at the position in which the vessel is situated. The method may further include rebuilding a 3D image of the body as a function of the measured characteristic. The method may further include locating a starting place and an arrival place on the image of the vessel. The method may further include segmenting the image of the body in order to extract from it an image of the vessel in the form of a tubular wall between the starting place and the arrival place on the image. The method may further include plotting wall lines on the tubular wall between the starting place and the arrival place, and measuring a length of the wall lines.

DESCRIPTION OF THE DRAWINGS

The invention will be understood more clearly from the following description and the accompanying figures. These

3 figures are given purely by way of an indication and in no way restrict the scope of the invention.

Figure 1:
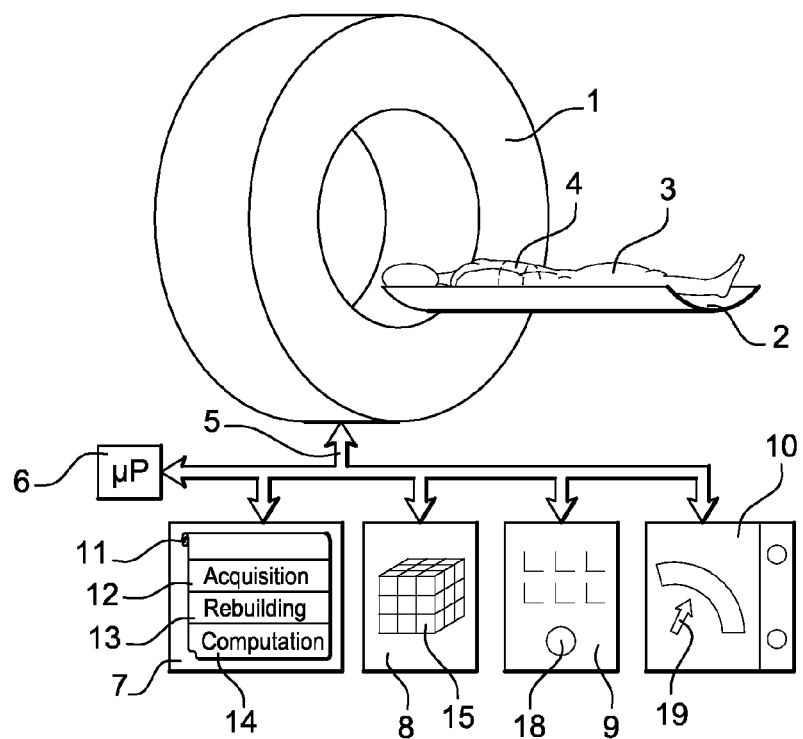
Figure 5:
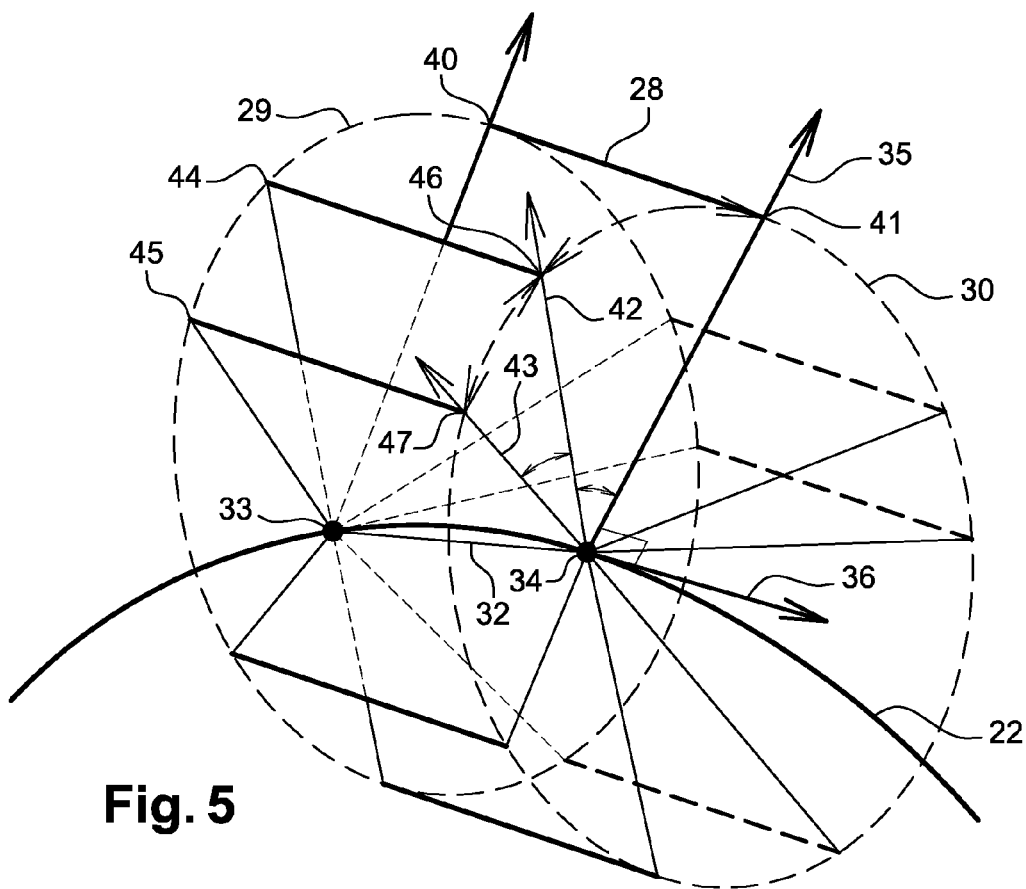
Figure 2A:
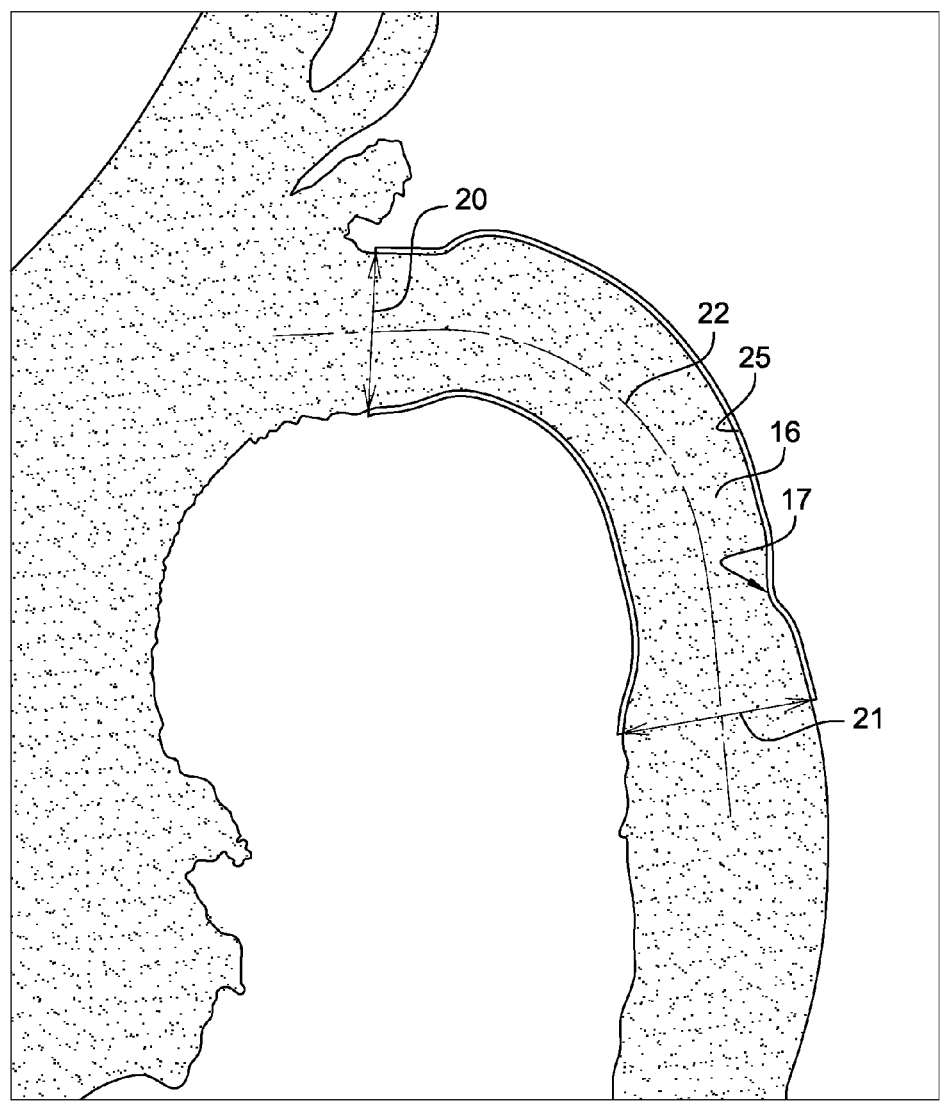
Figure 2B:
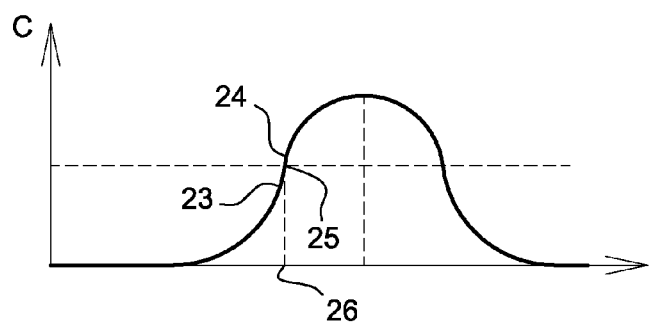
Figure 3:
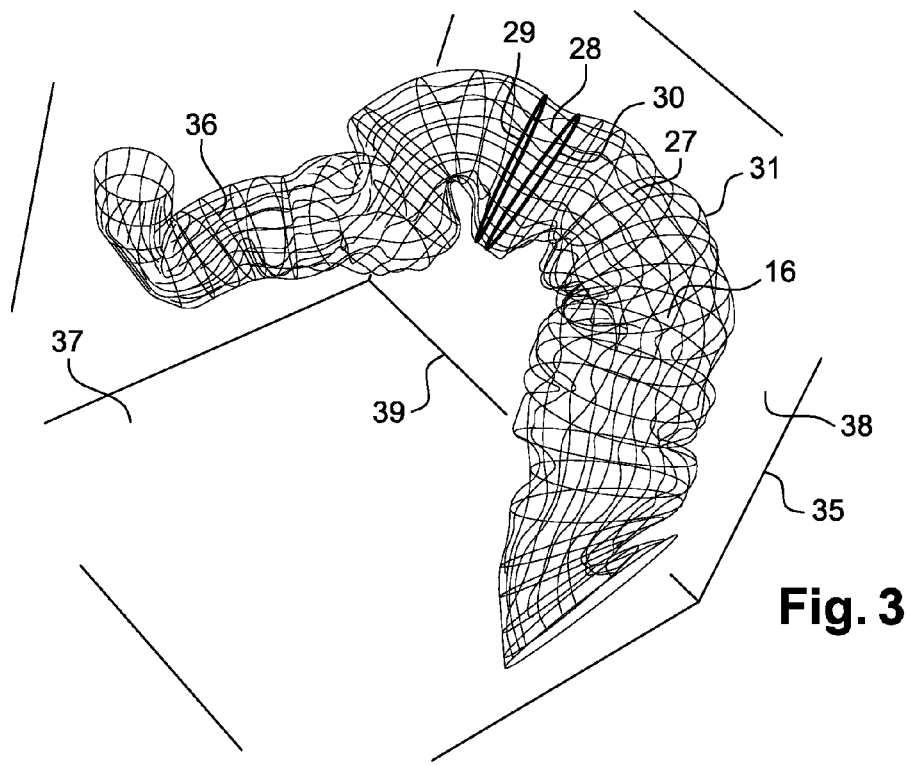
Figure 4:
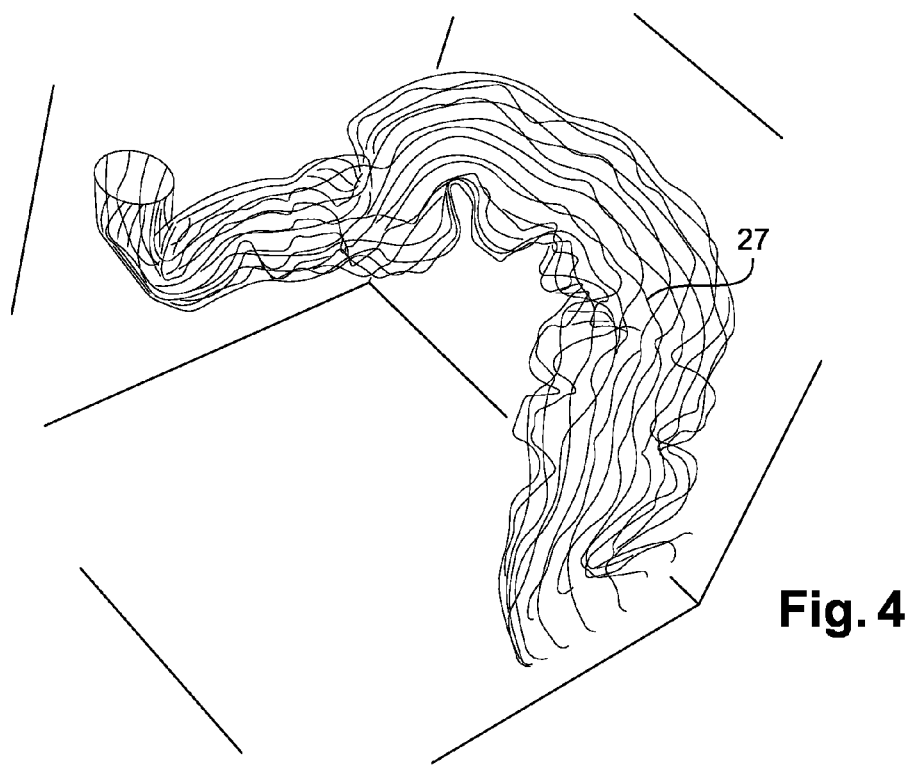

Of these figures:

FIG. 1 is a schematic view of a medical apparatus capable of implementing the method of the invention;

FIGS. 2a and 2b provide a view of an aorta before it is fitted out in order to reduce its stenosis, and of a profile of a signal measured along a plane perpendicular to the wall of this aorta;

FIG. 3 provides a 3D view of a lattice representing wall line segments and their building mode;

FIG. 4 is a schematic view of the wall lines;

FIG. 5 shows a mode of obtaining central line segments and wall line segments useful for performing the computation of length according to the invention.

MORE DETAILED DESCRIPTION

FIG. 1 shows a device that can be used to implement the measurement method of the invention. In one example, a vascular radiology machine (or a computerized tomography machine) enables the reception, in using an examination bed 2, of a patient 3 with a part 4 of his or her body requiring examination. The machine 1 may also be an NMR machine, an acoustic investigation machine, a nuclear medicine machine or any other machine of the same type. The machine 1 is controlled by a computer assembly connected by an address and data control bus 5 to a microprocessor 6, a program memory 7, a data memory 8, a control peripheral 9 and a display peripheral 10. Other means may be added to this computer assembly. The program memory 7 has a program 11 comprising the following in a known way: an acquisitions sub-program 12, a rebuilding sub-program 13 and a sub-program 14 for dimensional computation according to the invention.

Under the action of the microprocessor 6 and in application of the sub-program 13 and of commands launched by the peripheral 9, the machine 1 launches an examination of the body of the patient 3, in the zone 4, with the aim of producing a 3D digital image 15 of the body 3 in the zone 4. Should the machine 1 be a radiology machine, the characteristic of the body 3 that is measured is the index $\mu$ of radiological absorption of each of the cells of the body 3. Otherwise, the characteristic may be an acoustic reflection characteristic in the case of an acoustic acquisition machine or a value of magnetic susceptibility in the case of an NMR machine. Any other phenomenon in physics can be envisaged provided that it is possible, with this phenomenon, to acquire a 3D image 15 of the body 3 in the zone 4.

Once the acquisition has been made, using the sub-program 13, the 3D image of the body 3 is rebuilt as a function of the characteristic measured. This rebuilding leads to making voxels situated in the body 3 correspond to the addresses of the memory cells of the memory 8.

On the practical plane, it is then possible to display an image on the device 10 of the zone 4, namely a useful part of the body 15, in a section or in a front view. For example, FIG. 2a shows an image of an aorta 16 with a notable narrowing 17 that can be treated by the positioning of a stent.

The invention uses a control peripheral 9, comprising especially a trackball or a mouse 18 to shift a pointer 19 (FIG. 1) to locate a starting place 20 and an arrival place 21 in the vessel 16 in the image (FIG. 2a).

Once the starting and arrival points have been designated, or prior to it, it is sought to obtain a segmentation of the image 15 for the extraction from it of an image of the vessel in the form of a tubular wall, between the starting place and the arrival place. If this extraction is done beforehand, as in the case shown here in, the pointing is done in the image obtained. If the extraction is done subsequently, the image used for the pointing will be the image of a central line.

In one example, the obtaining of the tubular wall is done by the preliminary discovery of a central line 22 (FIG. 2a) of the vessel. The discovery of this central line is done by measuring a variation of contrast and by taking account of the place with the highest contrast.

When images are obtained in vascular radiology, it is generally done by subtraction. To this end, a first image is acquired without the presence of a contrast product and a second image corresponding to the presence of a contrast product is subtracted from this first image.

Given that the vessels are generally circular, in a plane perpendicular to a main direction of the vessel and by projection on a straight line contained in this plane, line 22, the contrast is the maximum right at the centre of the vessel. There are many algorithms known in the prior art for the identification, in the space of the digital volume 15, of the place of the central line 22.

Since this central line 22 is known, it is possible from this central line 22 to carry out a segmentation of the digital volume so as to search for the wall of the tubular vessel. For example, starting from this central line 22, and in every direction, it is possible to determine the place of the voxels for which, on either side, FIG. 2b, the contrast signal goes from a value 23 below a threshold 25 to a value 24 above this threshold 25. The place 26 at which the signal makes these passages 25, shown in FIG. 2a, is considered to be the boundary of the wall of the vessel.

FIG. 3 provides a view, in lattice form, of the presence of wall lines 27 formed by line segments such as 28. The line segments 28 are demarcated by contours 29 and 30 on either side. The contours 29 and 30 correspond to sections of the wall 31 of the vessel 16 intersected by separator planes. The separator planes 29 and 30 are positioned along the central line 22 at the ends of a set of central line segments by which this central line 22 is divided. The directions of the planes 29 and 30 are perpendicular to the tangents to the central line 22 at the position of these ends of segments.

FIG. 4 gives a view, without the separator planes 29 and 30, of the image of the wall lines 27 of the vessel 16 on which computations of length and curvature have been made.

FIG. 5 provides a magnified view of the central line 22 of the vessel 16, the separator planes 29 and 30 and wall line segments 28 situated facing a central line segment 32. The segments 28 are demarcated by the two separator planes 29 and 30. Along the central line 22, the segment 32 has two ends 33 and 34. The directions of the plane 30, including the direction 35, are determined by the perpendicularity of this plane 30 to a tangent 36 of the central line 22 at the position of one end, in this case the end 34. Going from one plane to the next along the central line 22, it is possible to determine a set of separator planes that correspond to each other and mutually determine tubular sections of the wall 31.

The construction of the lines begins by the placing of the point 33 on the central line 22, at the position of the starting point 20 (FIG. 2a). The direction of the central line 22 at the position of the point 33 being known, the plane 29 can be determined as being perpendicular to this direction. The segments 32 divide the central line 22, between the starting point 20 and the arrival point 21, into a number of equal segments M. The position of the point 34 on the curved abscissa along the central line 22 can thus be easily determined. In one example M is equal to 30. Similarly, the plane 30 can be determined with this direction 35. Continuing in this way, the set of separator planes is determined.

To determine the segments 28 of the wall line, for example an arbitrary direction 35 is chosen in the plane 30. Preferably, the direction 35 is parallel to a mean plane occupied by the vessel 16 to be considered. Thus, it can be seen in FIG. 3 and FIG. 4 that the vessel 16 is deployed, at one end 36, parallel to a plane 37 and in a part concerned by the invention, between the starting point 20 and the arrival point 21 in a plane 38. The plane 38 comprises the direction 35. It is also possible furthermore to recognise the direction of the planes 37 and 38. Preferably, the direction 35 will be taken, in the plane 38, as being perpendicular to the intersection 39 after two planes 37 and 38. This choice of direction 35 may nevertheless be arbitrary and it is possible to do without this preliminary determination step. The choice of the planes 37 and 38 amounts to planning for minimum torsion to determine the wall lines.

With the direction 35 being fixed, a secant plane is determined that contains both the first central line segment 32 and the direction 35. This secant plane intersects the wall 31 at the position of a wall line segment 28. The segment 28 is furthermore determined by the separator planes 29 and 30. The segment 28 is thus determined by a starting point 40 and an arrival point 41, both placed along a contour of the wall 31 formed by the intersection of this wall 31 with the separator planes 29 and 30.

To determine a certain number N of wall line segments between the two separator planes 29 and 30, two procedures are possible: in the first alternative, from the plane 38 comprising the direction 35, a set of secant planes is determined by regular angular subdivision, this set of secant planes thus comprising the directions 42, 43 and so on so forth. In the second preferable alternative, along the contour formed by the intersection of the separator planes 29 with the wall 31, this contour is subdivided into a set of N evenly spaced out arcs. The result of this is that the point 40 thus gives the possibility of creating N points such as 44, 45 and following points, at a distance from one another equal to an arc of equal length.

Correspondingly, the points 40, 44, 45 and those that follow are used to determine a set of homologous points 41, 46, 47 and those that follow, corresponding to a subdivision into a number N of equal arcs along the contour 30.

It can be seen that contours determined by the separator planes 29 and 30 do not necessarily have the same lengths, especially at the position of the narrowing 17. The points 40 and 41, 44 and 46, 45 and 47, are homologous points that correspond to each other from the first determined segment 28. For a following separator plane, since the points 41, 46 and 47 are already known, it is necessary, with the direction of the plane 38 (of the direction 35) to determine a point homologous to the point 41 and, from this homologous, point 41, again determine a number N of points homologous with the points 41, 46, 47 and the following points. Continuing in this manner, the work is undertaken until the last separator plane is situated at the position of the arrival place 21. Thus, a set of homologous wall line segments is produced, following one another between the two end separator planes. It is then enough to measure the length of each of these wall line segments.

To compute the maximum length and the minimum length, it is enough to add up the lengths of the homologous wall line segments to determine which is the longest wall line, and the shortest wall line. It is also possible to determine a mean of the wall line lengths.

In one example, the number N of points will be taken to be equal to 32 but another number can also be envisaged.

The description has hitherto presented the computation of the length. However, with a depiction of this kind, other dimensions of vessels can be computed. For example, the curves, diameters, deformations of the vessels may also be computed.

What is claimed is:

1. A computer implemented method for determining dimensions of a vessel, the method comprising:
   making a 3D acquisition of characteristics of a body at the position in which the vessel is situated;
   rebuilding a 3D image of the body as a function of the acquired characteristic;
   locating a starting place and an arrival place on the image of the vessel;
   segmenting the image of the body in order to extract from it an image of the vessel in the form of a tubular wall between the starting place and the arrival place on the image;
   plotting wall lines on the tubular wall between the starting place and the arrival place; and
   determining a length of one or more of the wall lines.

2. A method according to claim 1, further comprising:
   producing an image of the vessel in the form of contours of adjacent sections in the tubular wall;
   placing points on these contours; and
   determining distances between homologous points situated on adjacent contours.

3. A method according to claim 1, further comprising:
   segmenting the image of the vessel from a central line of the vessel to produce the image of the vessel in the form of the tubular wall in the form of contours of adjacent sections.

4. A method according to claim 3, further comprising:
   dividing the central line into a set of segments separated by planes, the planes being perpendicular to tangents to these segments at their point of intersection with them;
   determining at least one segmented contour of the tubular wall for each set of segments;
   determining, on each segmented contour of the tubular wall, a point situated at the intersection of a main plane containing a central segment with the tubular wall, the main plane being oriented in a main direction;
   determining a length of each segmented contour;
   dividing the length of each segmented contour into a number N of equal curvilinear segments separated by points of the contour;
   organizing the contour points in each contour so that they are homologous; and
   determining distances between the homologous points forming wall line segments.

5. A method according to according to claim 3, further comprising:
   dividing the central line into a set of central line segments, each of the central line segments being separated by a separator plane, each separator plane being perpendicular to a tangent to the central line segments at a point where each end of the central line segment intersects the respective plane; and
   determining wall line segments on the tubular wall by intersection of the separator planes with the tubular wall.

6. A method according to according to claim 1, further comprising:
   determine a minimum length and a maximum length of the wall lines.

7. A method according to according to claim 1, wherein the 3D acquisition is made using computerized tomography, ultrasound investigation or NMR.

* * * * *